United States Patent [19]
Sakurai

[11] Patent Number: 5,723,968
[45] Date of Patent: Mar. 3, 1998

[54] VARIABLE SPEED SYSTEM

[75] Inventor: Hisao Sakurai, Nagoya, Japan

[73] Assignee: Mitsubishi Denki Kabushiki Kaisha, Tokyo, Japan

[21] Appl. No.: 537,278

[22] Filed: Sep. 17, 1995

[30] Foreign Application Priority Data

Oct. 5, 1994 [JP] Japan ................... 6-241405

[51] Int. Cl.$^6$ ........................... B06B 1/28
[52] U.S. Cl. ............... 318/802; 318/811; 187/293
[58] Field of Search ................ 318/560–566, 318/606–624, 727, 729, 739–744, 757–765, 798–803, 806–807, 809–811; 187/293, 281

[56] References Cited

U.S. PATENT DOCUMENTS

| | | | |
|---|---|---|---|
| 3,735,221 | 5/1973 | Bell et al. | 318/151 |
| 4,355,274 | 10/1982 | Bourbeau | 318/812 |
| 4,478,009 | 10/1984 | Rukavina et al. | 318/571 |
| 4,548,299 | 10/1985 | Nomura | 318/741 X |
| 4,554,999 | 11/1985 | Kamaike | 318/800 X |
| 4,558,265 | 12/1985 | Hayashida et al. | 318/561 |
| 4,574,226 | 3/1986 | Binder | 318/434 X |
| 4,707,646 | 11/1987 | Thompson et al. | 318/434 X |
| 4,853,605 | 8/1989 | Matsuo et al. | 318/729 |
| 4,987,351 | 1/1991 | Disser et al. | 318/78 |
| 5,184,057 | 2/1993 | Sakai et al. | 318/803 |
| 5,241,141 | 8/1993 | Cominelli | 187/293 X |
| 5,284,325 | 2/1994 | Sasaki et al. | 318/434 |
| 5,420,491 | 5/1995 | Kanzaki et al. | 318/727 |
| 5,543,698 | 8/1996 | Tao et al. | 318/611 |

FOREIGN PATENT DOCUMENTS

| | | |
|---|---|---|
| 138068 | 6/1987 | Japan. |
| 3-56308 | 3/1991 | Japan. |
| 141402 | 5/1994 | Japan. |

*Primary Examiner*—Brian Sircus
*Attorney, Agent, or Firm*—Sughrue, Mion, Zinn, Macpeak & Seas, PLLC

[57] ABSTRACT

A variable speed elevator drive system for automatically discriminating between large and small loads, and for adjusting a maximum cage speed (maximum output frequency) in accordance with such load. The system comprises a voltage detection circuit 4, a current detection circuit 5, and a CPU 6A which discriminates between large and small loads by a value I2 obtained by averaging a detected current I for a current detection range and current detection period that are provided as parameters, and automatically adjusts the maximum output frequency by determining a regenerative or power running state from the detected voltage and current. By making variable the current detection range and period, and a first order lag filter time constant used in averaging the current, an optimal maximum output frequency corresponding to the load may be selected to improve the operating efficiency even when fluctuations in the load are large. Further, by limiting a speed increase in the regenerative state, it is possible to prevent a dangerous operation such as descending with the speed being increased when the elevator is accelerated in a regenerative state.

11 Claims, 9 Drawing Sheets

VARIABLE SPEED SYSTEM

BACKGROUND OF THE INVENTION

1. Field of the Invention

The present invention relates to a variable speed system for automatically discriminating between large and small of a load based on a detected current to adjust a maximum speed (maximum output frequency) of a motor of an elevator or the like in accordance with the load.

2. Description of the Related Art

Construction of a known variable speed system will be described below with reference to FIG. 6. FIG. 6 shows the construction of a known variable speed system.

Referring to FIG. 6, the known variable speed system includes: a converter section 1 for converting a three-phase alternating current into a direct current; an inverter section 2 for converting a DC power into an AC power of variable frequency and variable voltage; a smoothing capacitor 3 for smoothing a direct current; a voltage detection circuit 4; a current detection circuit 5; a CPU 6; a memory 7 for storing parameters; and a PWM (pulse-width modulation) circuit 8. An induction motor IM 9 is driven with its speed being controlled by the AC power from the inverter section 2.

Operation of a known variable speed system will be described below with reference to FIGS. 7, 8 and 9. FIG. 7 shows the relation between output voltage and output frequency of the known variable speed system. FIG. 8 shows the relation between acceleration/deceleration time and output frequency of the known variable speed system. FIG. 9 shows the relation between output frequency and torque of the known variable speed system.

In FIG. 7, f0 and V0 represent a base frequency (output frequency of the variable speed system for the rated rotating speed of the motor) and a base frequency voltage, respectively.

In FIG. 8, ta, td, fmax and f represent acceleration time, deceleration time, maximum output frequency and operating frequency, respectively. It should be noted that tb is an acceleration time to be obtained by a predetermined equation while tc is a deceleration time to be obtained by a predetermined equation.

In FIG. 9, symbols are used to respectively represent f0 for base frequency, Tmax for maximum output torque value, Tx for torque value necessary at load 1, Ty for torque value necessary at load 2 (<load 1), fx for a maximum output frequency which may be output at load 1, fy for a maximum output frequency which may be output at load 2.

In the known variable speed system, a speed control is performed while maintaining the ratio of output voltage to output frequency (V/F) to a constant value as shown in FIG. 7 based on the relation between the base frequency f0 and the base frequency voltage V0.

Further, the acceleration time ta for reaching the maximum output frequency fmax and the deceleration time td for stopping from the maximum output frequency fmax are provided as parameters. Operation is performed by determining acceleration time tb and deceleration time tc from an operating frequency f based on the following equations 1 and 2.

Acceleration time $tb=$(Maximum output frequency $fmax$/Operating frequency $f)^{-1} \times$Acceleration time $ta$     (1)

Deceleration time $tc=$(Maximum output frequency $fmax$/Operating frequency $f)^{-1} \times$Deceleration time $td$     (2)

The known variable speed system operates to effect a forward or reverse rotation of the induction motor 9 by performing acceleration/deceleration as shown in FIG. 8 in accordance with the V/F control as shown in FIG. 7. The output frequency at this time may be obtained from the relation between output frequency and torque as shown in FIG. 9.

The maximum output frequency for load 1 (requiring torque Tx) in the frequency range of the base frequency f0 or higher is equal to or lower than frequency fx, since the torque obtained in the frequency band of fx or higher is smaller than torque Tx which is necessary for load 1. Further, the maximum output frequency for load 2 (requiring torque Ty) is equal to or lower than frequency fy, since the torque obtained in the frequency band of fy or higher is smaller than torque Ty which is necessary for load 2.

As a result of the above, in order to obtain a sufficient torque for various large and small loads, the motor 9 is rotated by setting an operation frequency to a frequency lower than the output frequency at which torque for the maximum load may be obtained.

In the known variable speed system as described, the maximum output frequency can be set at a relatively high level if the load is relatively small. However, if the load is larger, there is a problem that a sufficient torque cannot be obtained and an elevator, for example, cannot be raised unless the maximum output frequency is set to a relatively low level. For this reason, it has been necessary in operation to set the maximum output frequency to a frequency at which a sufficient torque for the maximum load may be obtained. In other words, of the example shown in FIG. 9, the maximum output frequency is set to fx and the maximum output frequency is fx even when the load is relatively small. For this reason, if the load is small, it takes time for acceleration due to a low maximum output frequency, causing a problem that the operation time cannot be shortened to result in a low efficiency.

It should be noted that, in Japanese Patent Laid-Open No.3-56308, a power value at a frequency higher than the rated frequency is obtained from voltage and current and is compared with the power value at the rated frequency to provide a value for setting a speed to the variable speed system.

In Japanese Patent Laid-Open Publication No.3-56308, however, since output frequency is determined from the power obtained from voltage and current, a change in current due to a change in the load becomes a change in power which results in a change in the output frequency and makes the output frequency unstable. Further, since speed is increased in a regenerative operation at a relatively light load, it is very dangerous in an elevator or the like as the speed is excessively increased at the time of its descending.

SUMMARY OF THE INVENTION

To solve the above described problems, it is an object of the present invention to provide a variable speed system capable of automatically discriminating between regenerative and power running states, capable of automatically discriminating between large and small loads, and capable of adjusting a maximum speed (maximum output frequency) in accordance with the load.

A variable speed system according to the present invention comprises: a converter means for converting a three-phase AC power into a DC power; an inverter means for converting the DC power into an AC power of variable frequency and variable voltage; a voltage detection means for detecting a DC bus voltage at the output side of the converter means; a current detection means for detecting a current at the output side of the inverter means; and control means for determining large or small of a load connected to the inverter means based on the detected DC bus voltage and the detected current to adjust a maximum speed in accordance with the load based on set parameters. Accordingly, an optimum maximum output frequency according to the load may be selected to improve the operating efficiency.

DESCRIPTION OF THE PREFERRED EMBODIMENTS

Figure 1:
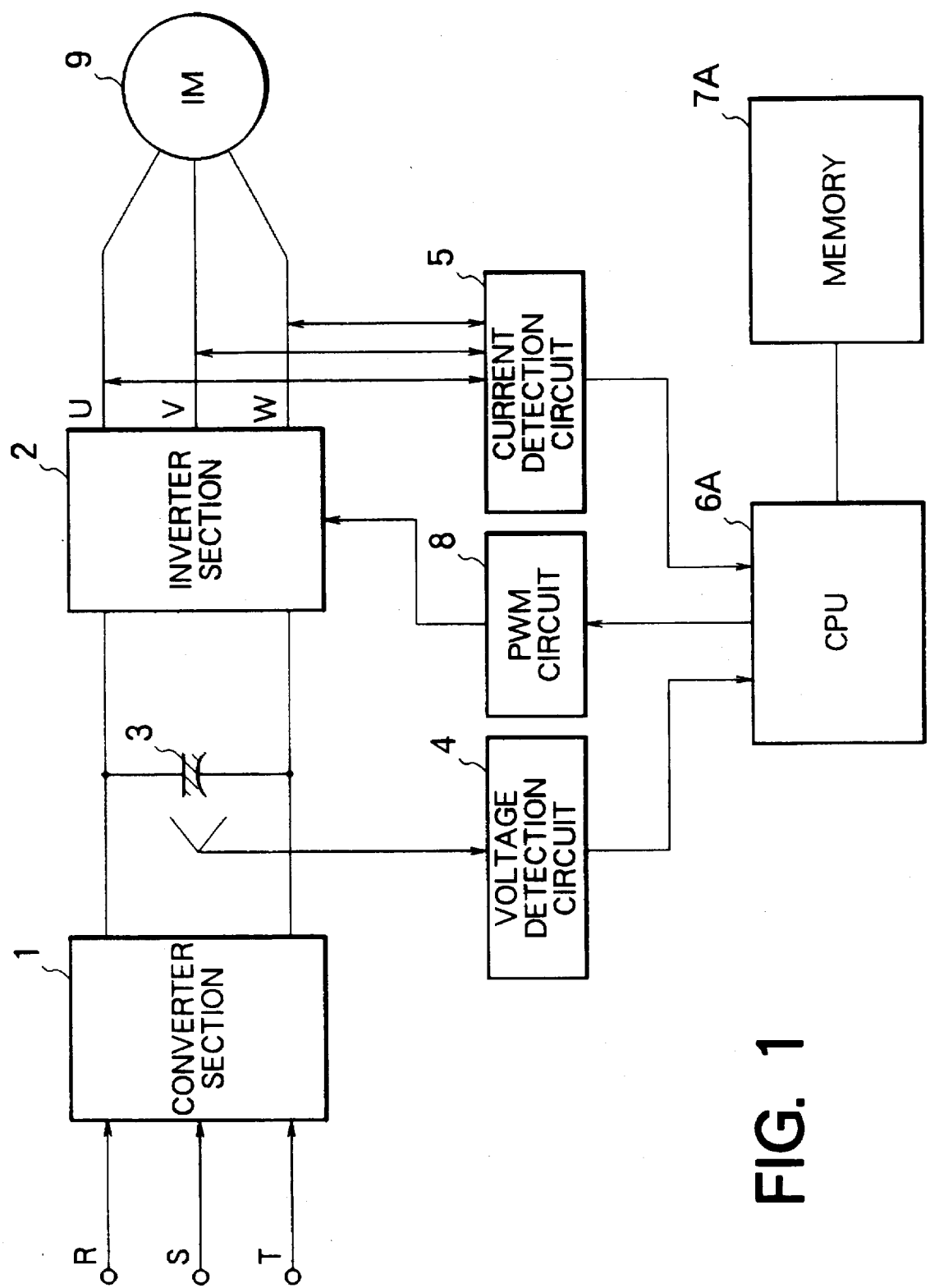
FIG. 1 shows construction of an embodiment of the present invention.

Construction of an embodiment of the present invention will now be described with reference to FIG. 1. It should be noted that, in the drawings, like reference numerals denote like or corresponding portions.

Referring to FIG. 1, a variable speed system according to an embodiment of the invention comprises: a converter section 1 for converting a three-phase alternating current into a direct current; an inverter section 2 for converting a DC power into an AC power of variable frequency and variable voltage; a smoothing capacitor 3 for smoothing a direct current; a voltage detection circuit 4; a current detection circuit 5; a CPU 6A containing ROM, RAM, etc.; a memory 7A for storing parameters; and a PWM (pulsewidth modulation) circuit 8.

An induction motor IM 9 is driven with its speed being controlled by the AC power of variable frequency and variable voltage from the inverter section 2. Further, the CPU 6A is different in function from the known CPU 6 as will be described below. Furthermore, the memory 7A is different in its stored content (parameters) from the known memory 7 as will be described below.

Figure 2:
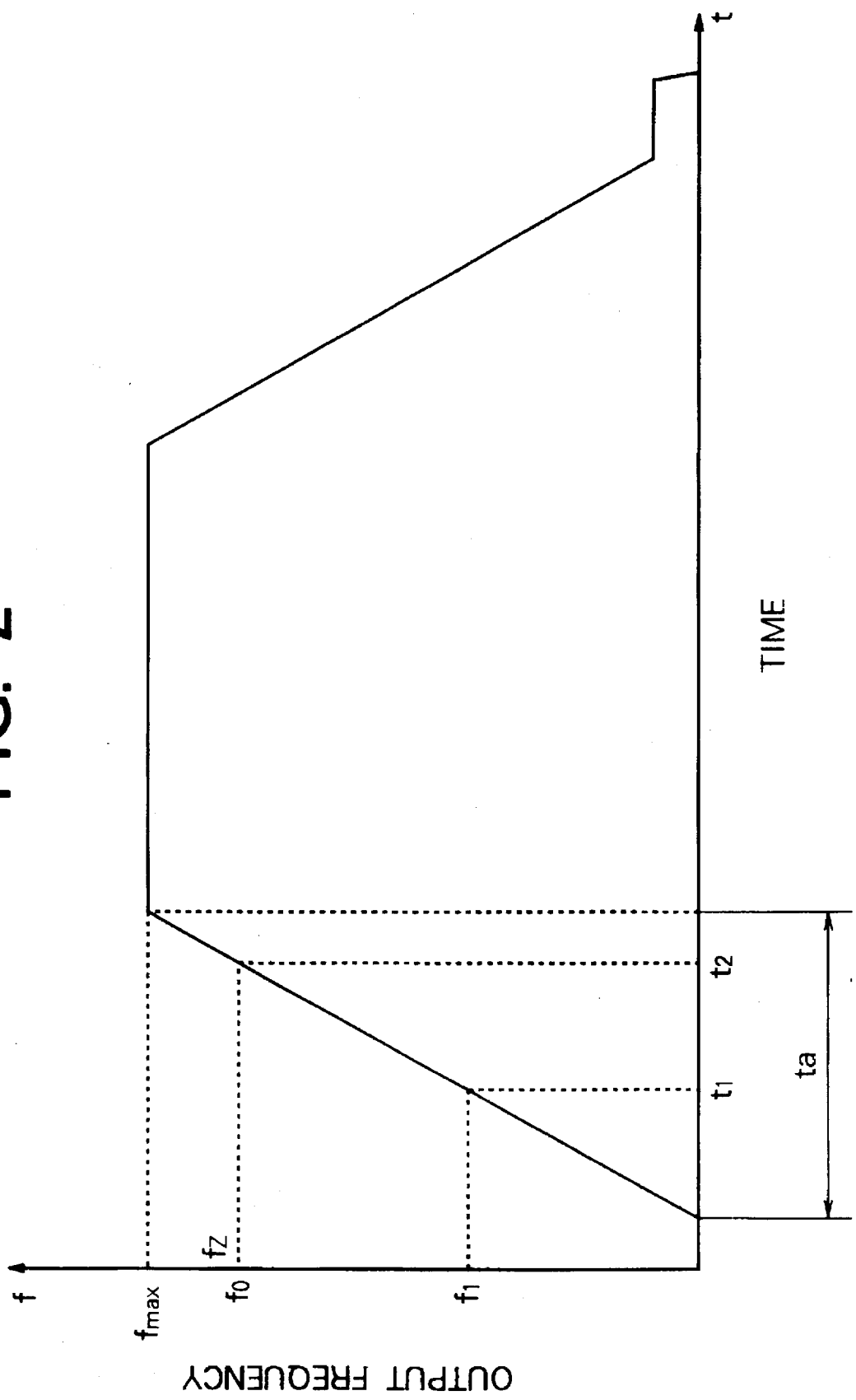
FIG. 2 shows the relation between time and output frequency in an embodiment of the invention.
Figure 3:
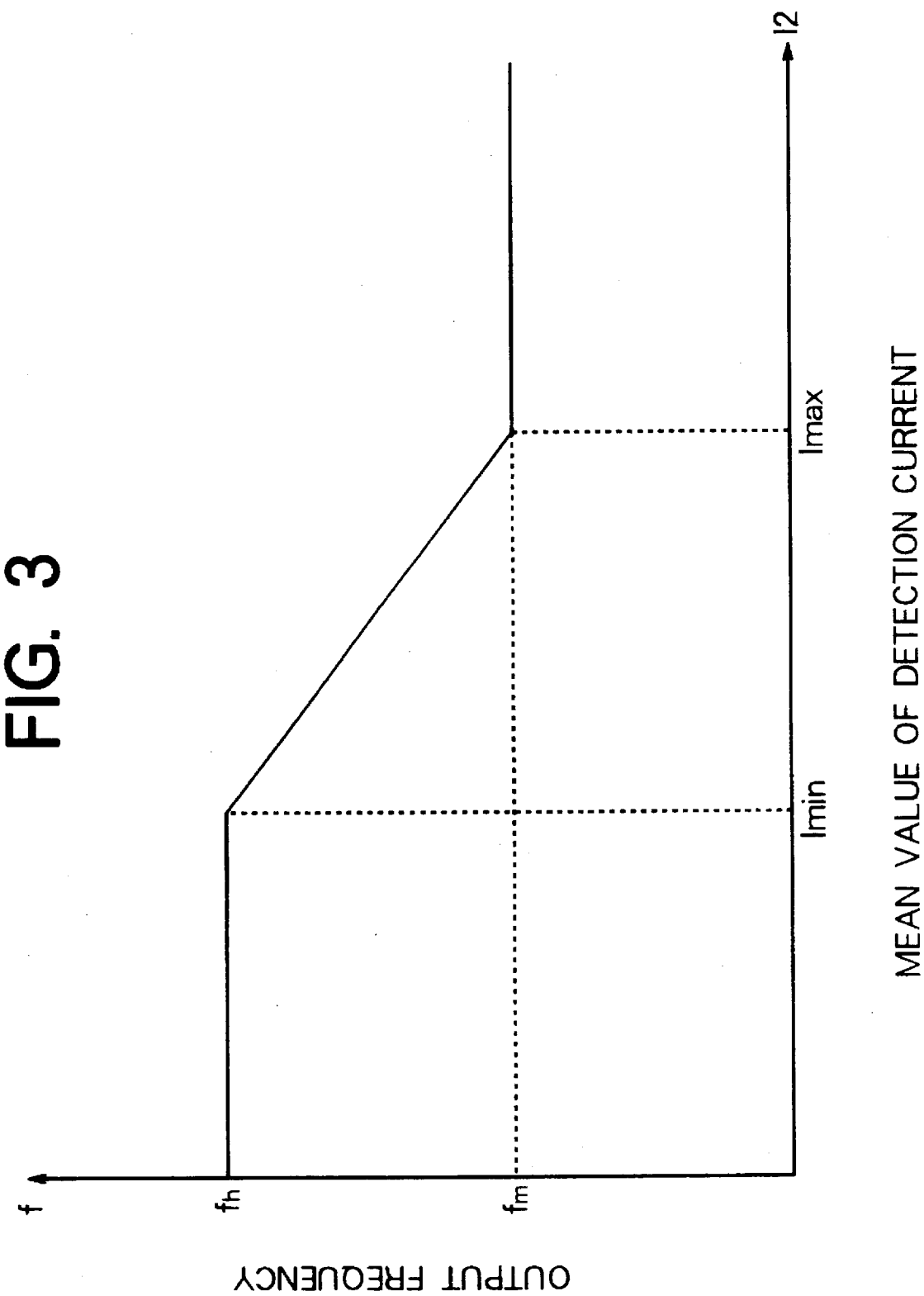
FIG. 3 shows the relation between mean value of detected current and output frequency in an embodiment of the invention.
Figure 4:
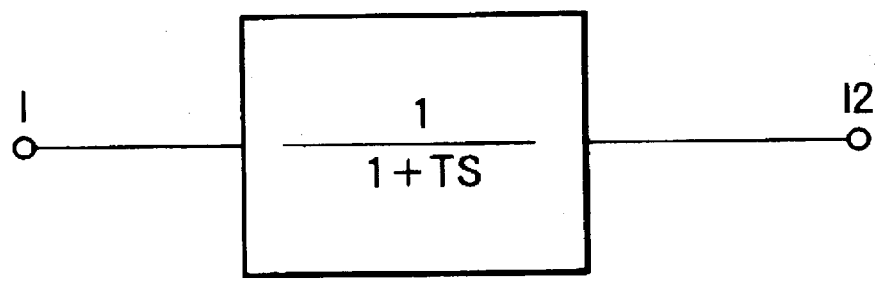
FIG. 4 shows a current averaging process of CPU (first order lag filter) in an embodiment of the invention.
Figure 5:
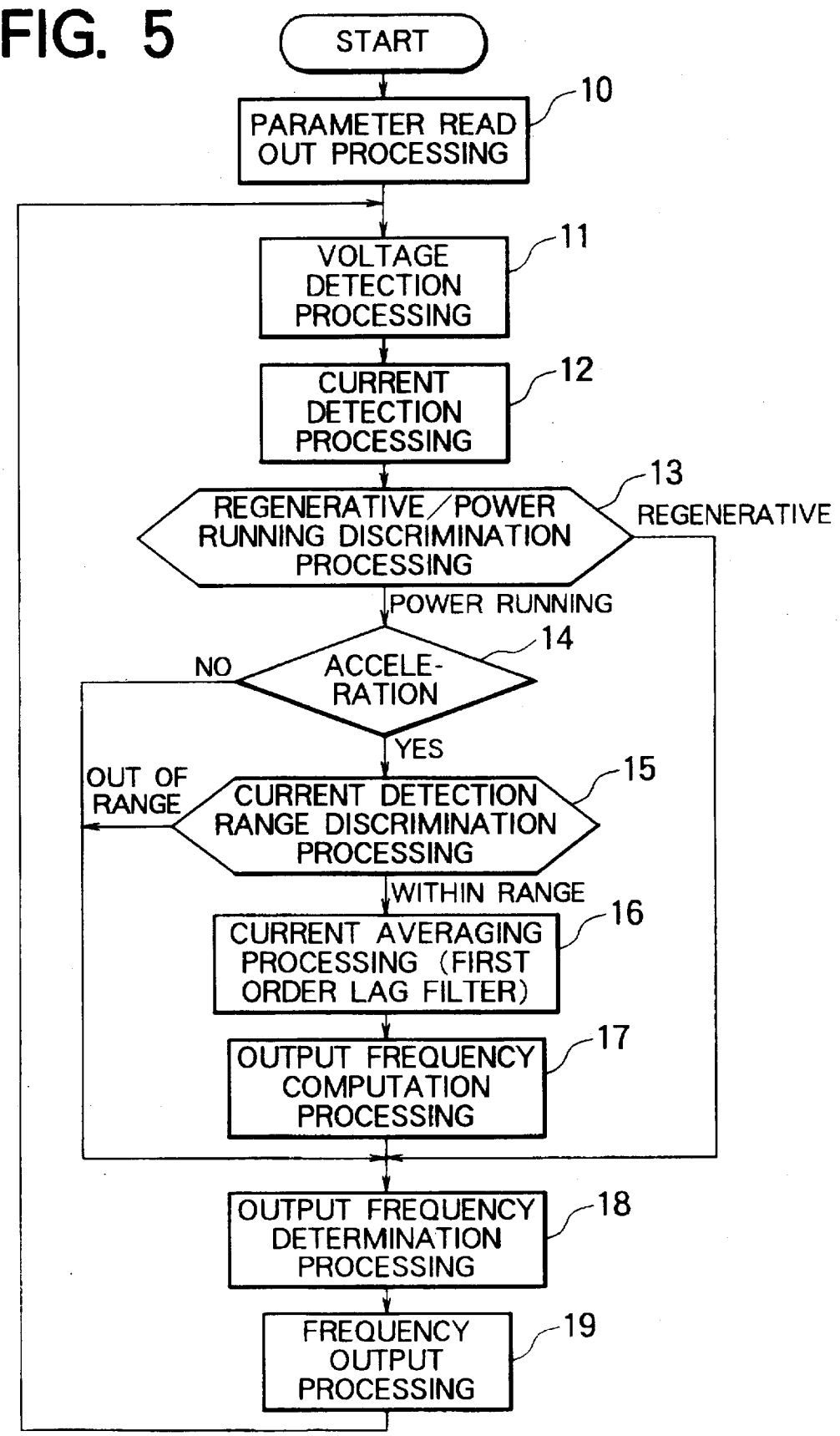
FIG. 5 is a flowchart showing operation of speed control of CPU in an embodiment of the present invention.
Figure 6:
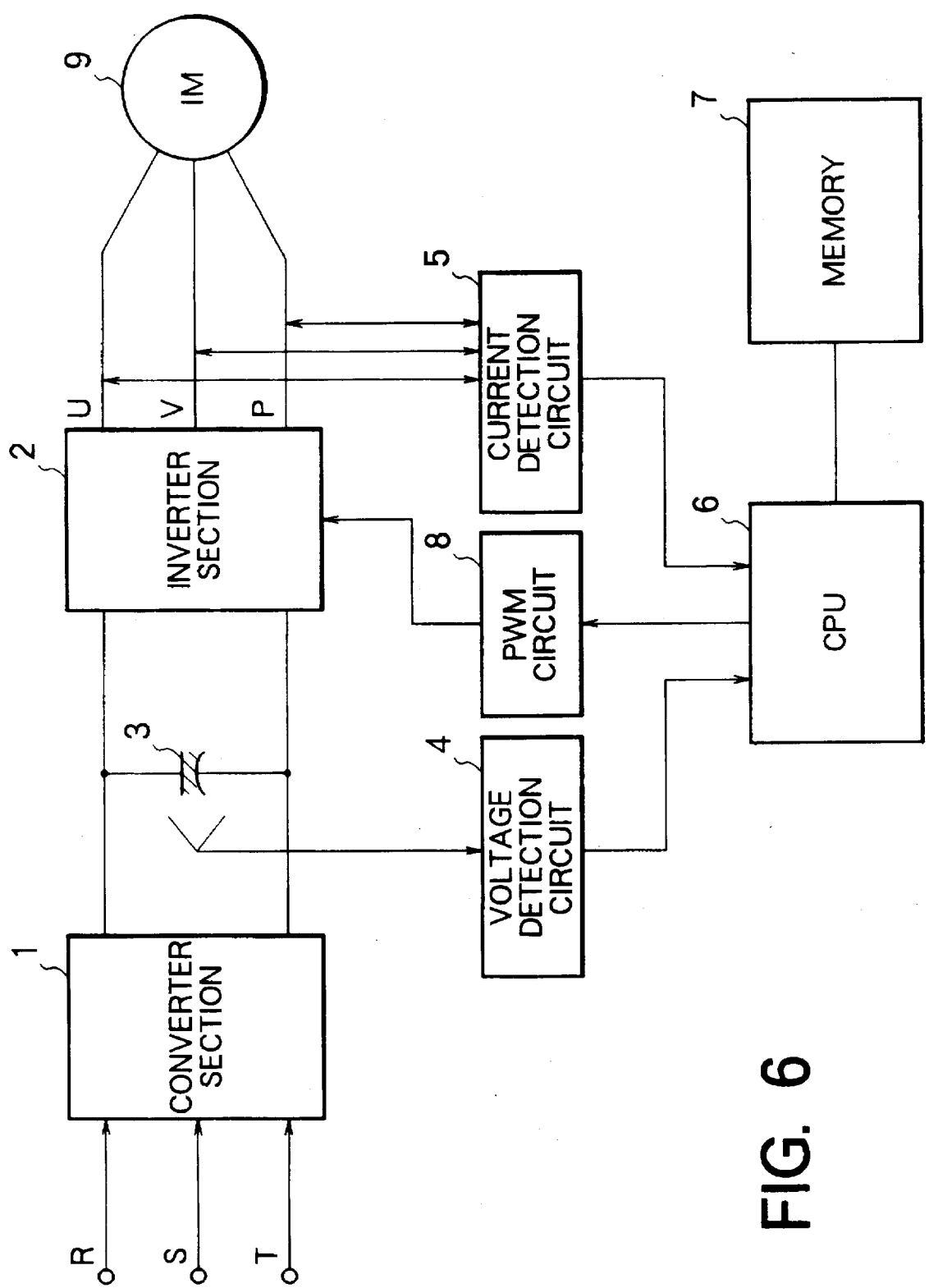
FIG. 6 shows construction of a privately known but unpublished variable speed system.
Figure 7:
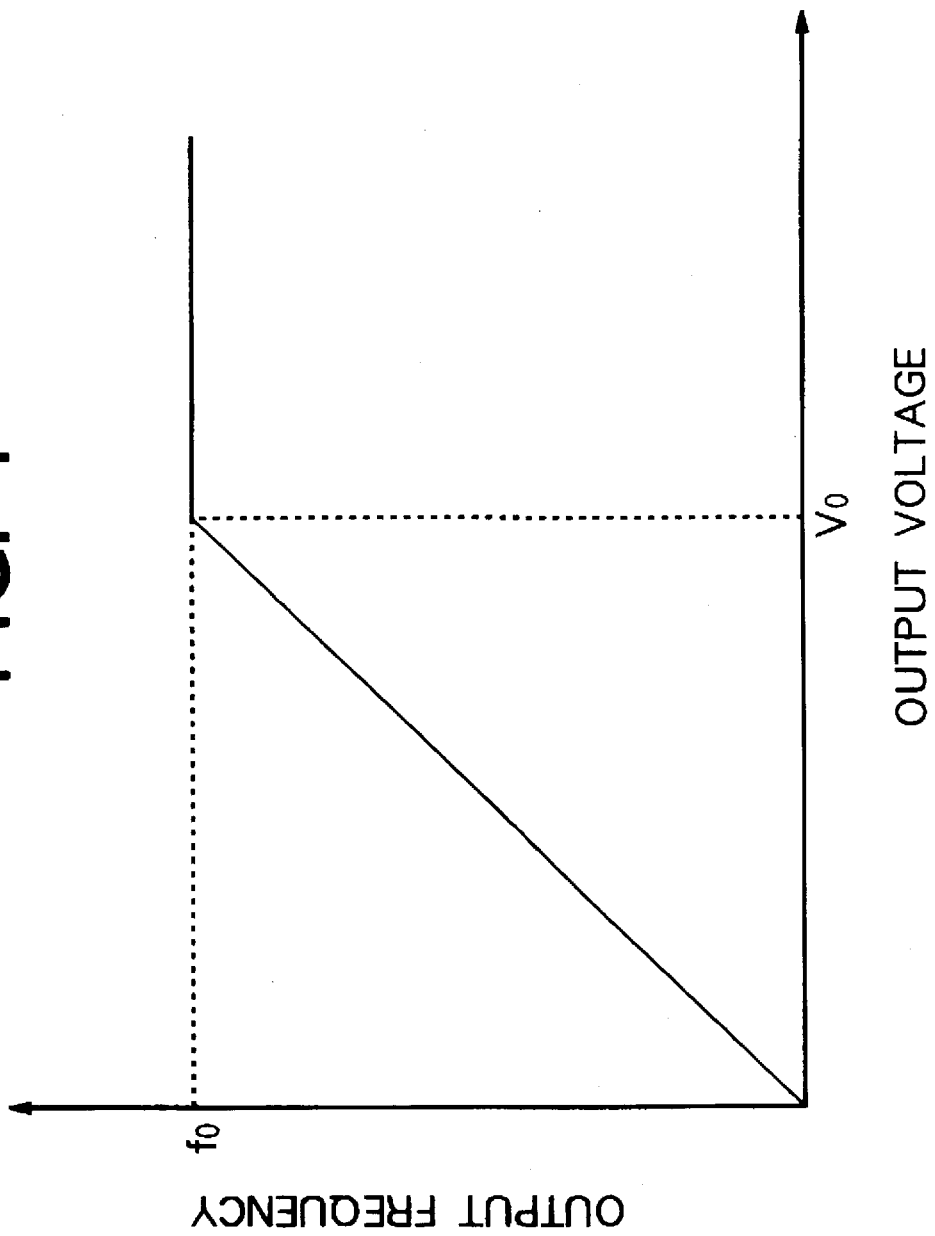
FIG. 7 shows the relation between output voltage and output frequency of a known variable speed system.
Figure 8:
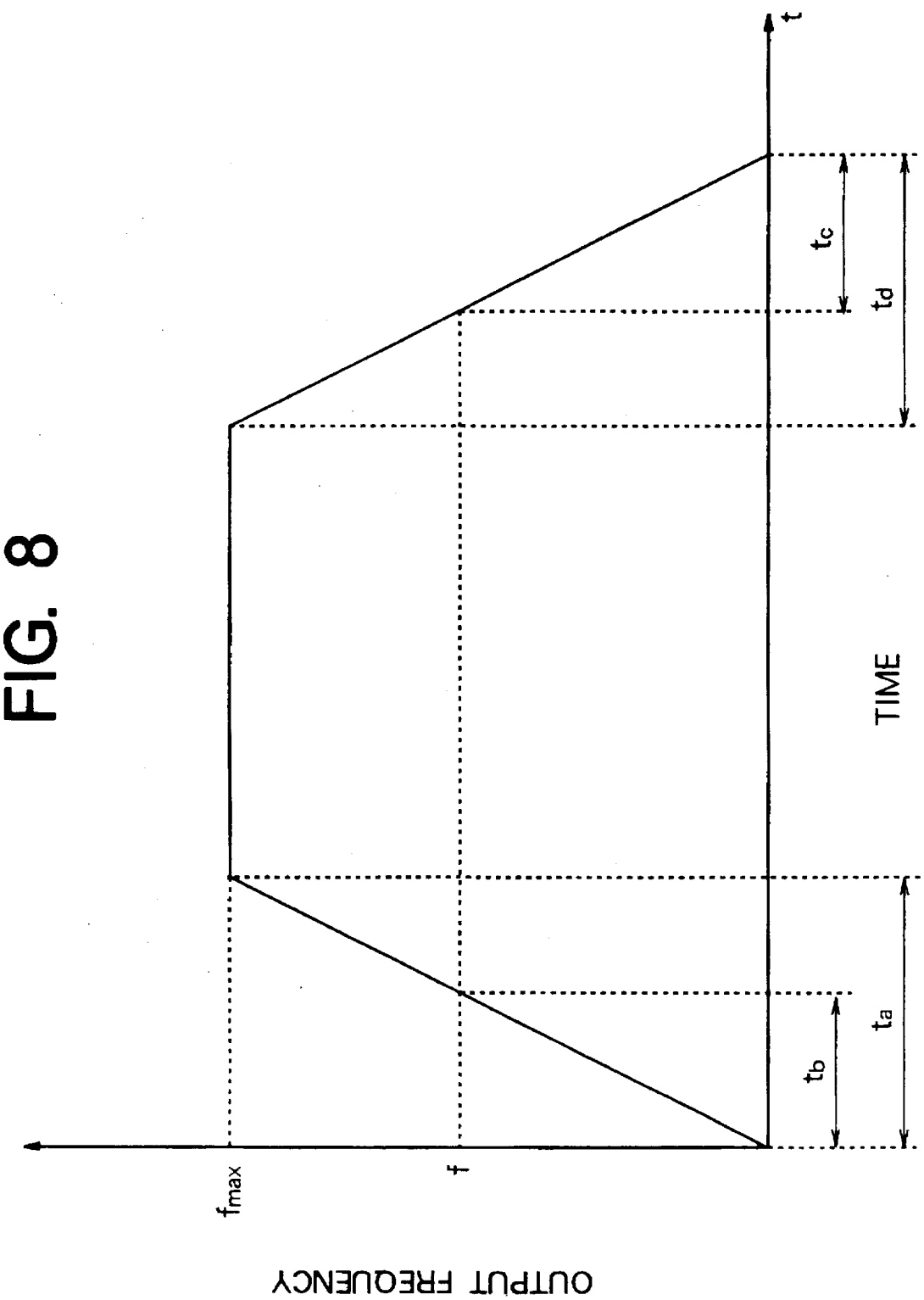
FIG. 8 shows the relation between acceleration/deceleration time and output frequency in the known variable speed system.
Figure 9:
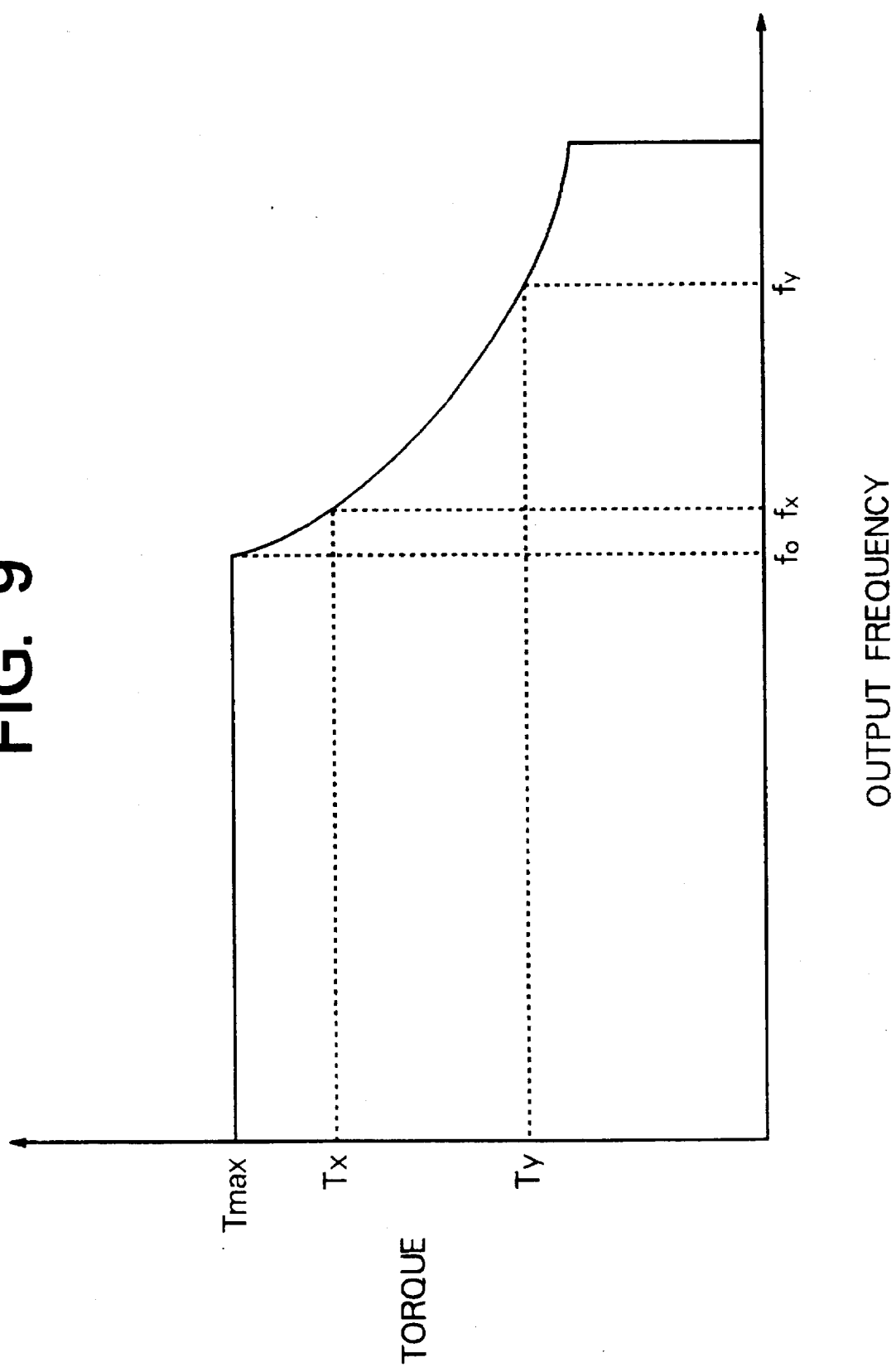
FIG. 9 shows the relation between output frequency and torque in the known variable speed system.

Operation of this embodiment will now be described with reference to FIGS. 2, 3, 4 and 5. FIG. 2 shows the relation between time and output frequency and also a current detection period in an embodiment of the invention. FIG. 3 shows the relation between mean value of the detected current and output frequency in an embodiment of the invention. FIG. 4 shows the current averaging process (first order lag filter) of CPU in an embodiment of the invention. FIG. 5 is a flowchart showing operation of speed control of CPU in an embodiment of the invention.

Referring to FIG. 2, fmax represents a maximum output frequency; f0 represents a base frequency; f1 represents ½ base frequency; t1 and t2 represent time periods (current detection time periods); and fz represents a current detection range.

Referring to FIG. 3, fh represents an output frequency at the time of high speed operation; fm represents an output frequency at the time of medium speed operation; Imax represents an upper limit current value of high speed setting; and Imin represents a lower limit current value of medium speed setting.

Referring to FIG. 4, T represents a current averaging filter time constant (first order lag filter time constant in averaging the current); I represents a detected current; and I2 represents an averaged current.

Referring to FIG. 5, operation of speed control of CPU includes: a parameter read out processing step 10; voltage detection processing step 11; current detection processing step 12; regenerative/power running state discrimination processing step 13; acceleration discrimination processing step 14; current detection range discrimination processing step 15; current averaging processing (first order lag filter) step 16; output frequency computation processing step 17; output frequency determination processing step 18; and frequency output processing step 19.

Previously stored in the memory 7A for example at the time of shipment from the factory as parameters are: acceleration time ta; maximum output frequency fmax; output frequencies (output frequency at high speed fh, output frequency at medium speed fm) for mean values of detected current; current detection range fz; upper limit current value Imax in high speed setting; lower limit current value Imin in medium speed setting; first order lag filter time constant T in averaging the current; and base frequency f0.

In the variable speed system according to this embodiment, a three-phase AC power supply is converted into a DC power by the converter section 1 and the DC power is converted by the inverter 2 into a variable frequency and variable voltage AC power.

First, the CPU 6A at the parameter read out processing step 10 reads from the memory 7A as parameters: acceleration time ta; maximum output frequency fmax; output frequencies (output frequency at high speed fh, output frequency at medium speed fm) for mean values of detected current; current detection range fz; upper limit current value Imax in high speed setting; lower limit current value Imin in medium speed setting; first order lag filter time constant T in averaging the current; and base frequency f0. Further, the CPU 6A obtains a current detection period (time t1, time t2) from the relation as shown in FIG. 2.

Next, the CPU 6A at the voltage detection processing step 11 detects by the voltage detection circuit 4 voltage at the time of converting a three-phase alternating current into a DC current by the smoothing capacitor 3, i.e., the DC bus voltage and takes in such detected voltage.

Next, the CPU 6A at the current detection processing step 12 detects a motor current of the motor induction machine (motor) 9 from the current detection circuit 5 and takes in such detected current I.

Next, the CPU 6A at the regenerative/power running state discrimination processing step 13 obtains a torque component current from the above detected current I, since the motor current may be divided into the torque component current and an excitation current. The criterional value to be used in this step is 300 V if, for example, the converter section 1 is to convert a three-phase power of 200 V into a DC power of 300 V. The CPU 6A determines an operation state as regenerative when the above obtained torque component current is negative and at the same time the above detected DC bus voltage is higher than the criterional value. All the other states are determined as power running.

Next, the CPU 6A at the acceleration discrimination processing step 14 determines whether or not the system is in an acceleration state based on the output frequency (fh, fm) provided as parameter and the actual output frequency at the current time. That is, if the system is in the power running state and there is a difference between the set output frequency and the actual output frequency, it is determined to be in the process of acceleration. For example, the system is determined as being accelerated when the set output frequency fh is larger than the actual output frequency or when the set output frequency fm is smaller than the actual output frequency.

Next, the CPU 6A at the current detection range discrimination processing step 15 determines whether or not the actual output frequency is within the electric current detection range fz. That is, it is determined as within the range when the system is in the acceleration state and when the actual output frequency is for example in an interval of one half the current detection range fz or ½fz from the current detection range fz for a certain time period based on the current detection range fz.

Next, if the actual output frequency is within the set current detection range (½fz–fz), the CPU 6A at the current averaging processing step 16 obtains a current I2 by averaging the current I to detect a more accurate load, since ripple of the detected current I becomes large due to fluctuation in load at the time of acceleration.

A first order lag filter for example is used in such averaging process. In the case of averaging by the first order lag filter, the CPU 6A obtains the current I2 by averaging the detected current I in accordance with FIG. 4 with respect to a current detection period (time t1, time t2) by means of the above described first order lag filter time constant T in averaging the current. Operation for obtaining the average current I2 is for example expressed in equation 3.

Average current $I2=(T-1)/T\times(\text{Last average current})+1/T\times(\text{Instantaneous current value})$ (3)

Here, the instantaneous current value in equation 3 is obtained from the detected current I.

The first order lag filter time constant T in averaging the current may be changed at will by means of setting of parameter. In setting the parameter a the first order lag filter time constant T in averaging the current, based on the ratio of the acceleration time ta to the current detection period (interval of time t1, time t2), if the acceleration time ta is relatively long, the first order lag filter time constant T in averaging the current may be set longer because a longer current detection time may be provided. Further, if the acceleration time ta is relatively short, since the current detection time is short, the first order lag filter time constant T in averaging the current is set to a short time period to accurately obtain I2.

Next, the CPU 6A at the output frequency computation processing step 17 computes an output frequency from the relation between the mean value of the detected current and the output frequency as shown in FIG. 3. That is, if the mean value I2 of the detected current is lower than the lower limit current value Imin of medium speed setting provided as a parameter, the CPU 6A sets the maximum speed (maximum output frequency) to the output frequency at high speed fh which is provided as a parameter. Further, the CPU 6A sets it to the output frequency at medium speed fm provided as a parameter if the mean value I2 exceeds the upper limit current value Imax of high speed setting provided as a parameter.

Further, if the mean value I2 is between the upper limit current value Imax and the lower limit current value Imin, the CPU 6A computes the output frequency f from the following equation 4.

Output frequency $f=fh-\{(fh-fm)/(Imax-Imin)\}\times(I2-Imin)$ (4)

Next, the CPU 6A at the output frequency determination processing step 18 determines an output frequency for each condition. That is, if the motor 9 is being accelerated in its power running state and the actual output frequency is within the current detection range, the CPU 6A determines as the output frequency f a value obtained from the current I2 averaging the detected current I at the step 17. Further, the CPU 6A determines it to a set output frequency (fh or fm) if the motor is judged as in its regenerative state at the above step 13, or if the motor 9 is not being accelerated at the step 14, or if the actual output frequency is outside the current detection range at the step 15.

The set output frequency fh is for the case where operation at a high speed is possible as the load is relatively small and the set output frequency fm is for the case where the speed cannot be increased because the load is heavy.

Finally, the CPU 6A at the frequency output processing step 19 provides the above determined output frequency to the PWM circuit 8. The PWM circuit 8 then provides to the inverter section 2 a control signal corresponding to the output frequency from the CPU 6A. In this manner, an optimal maximum output frequency corresponding to the load may be selected to improve the operating efficiency.

Further, the CPU 6A at the step 13 determines a power running state or a regenerative state based on the detected DC bus voltage and the detected current. If determined as in a regenerative state, speed will not be increased, i.e., the system will be operated for example at a constant speed. Thus, especially when accelerated in its regenerative state, it is possible to avoid a dangerous operation where an elevator or the like is descended with its speed being increased.

It should be noted that, if the current detection range fz of the output frequency is not provided as a parameter at the above current detection range discrimination processing step 15, the following method may also be employed. That is, in the process of accelerating the output frequency of the variable speed system to the set output frequency at high speed fh, the CPU 6A determines whether or not the current output frequency is between the base frequency f0 and for example one half the base frequency f0 or ½ base frequency f1 for a certain period based on the base frequency f0.

In other words, since the CPU 6A at the acceleration time of the motor automatically discriminates between a large and small load using a value obtained by averaging the detected current for a certain time period which is based on the base frequency f0, the current detection period for the discrimination between a large and small load may be fixed to a certain value. Further, the influence of ripple of the current with respect to changes in load may be minimized to obtain a more accurate current value by averaging the detected current so that an accurate determination may be made as to a large or small load.

Further, if the first order lag filter time constant T in averaging the current is not provided as a parameter at the current averaging processing step 16, it may be set automatically. The first order lag filter time constant T at the time of averaging the current in such automatic setting is in accordance with a ratio of a standard set value to the ratio fmax/ta of the maximum output frequency fmax to the acceleration time ta. Such standard set value is an initial value of the first order lag filter time constant T in averaging the current and is a standard time period determined by the ratio fmax/ta of the maximum output frequency fmax to the acceleration time ta. For example, the automatic setting of the filter time constant T may be obtained from the following equation 5.

Filter time constant $T = fmax/ta \times (\text{Filter time constant initial value}/Kx)$ (5)

Here, Kx=12 if a filter time constant initial value is set for starting at 5 sec, 60 Hz.

In the case of the above automatic setting, a suitable time constant is automatically set such that the first order lag filter time constant T in averaging the current is short when the acceleration time ta is short or constant is long when the acceleration time constant ta is long.

What is claimed is:

1. A variable speed system comprising:

a) a converter means (1) for converting a three-phase AC power into a DC power;

b) an inverter means (2) for converting said DC power into an AC power of variable frequency and variable voltage;

c) a voltage detection means (4) for detecting a DC bus voltage at an output side of said converter means;

d) a current detection means (5) for detecting a current at an output side of said inverter means; and e) control means including a memory (7A), a control circuit (6A) and a PWM circuit (8) for determining the magnitude of a load connected to said inverter means based on said detected DC bus voltage and said detected current, and for adjusting a maximum speed of the motor, and attendantly the maximum speed of a load coupled to the motor, in accordance with said determined load based on a plurality of parameters previously stored in said memory;

f) wherein said control circuit determines an output frequency for the inverter means corresponding to the determined magnitude of the load on the motor based on the plurality of parameters stored in said memory, and said PWM circuit outputs to said inverter means a control signal corresponding to said determined output frequency.

2. The variable speed system according to claim 1, wherein said plurality of parameters stored in the memory and on which the determination of the inverter output frequency is based include an acceleration time ta; a maximum output frequency fmax; a high speed output frequency fh for mean values of the detected current; a medium speed output frequency fm for mean values of the detected current; a current detection range fz; an upper limit current value Imax for a high speed setting; a lower limit current value Imin for a medium speed setting; a first order lag filter time constant T for averaging the current; and a base frequency f0.

3. The variable speed system according to claim 1 wherein said control circuit determines a power running or regenerative state based on said detected DC bus voltage and said detected current, the system being operated at a constant speed when determined to be in said regenerative state.

4. The variable speed system according to claim 3 wherein said control circuit determines the system to be in said regenerative state when said DC bus voltage is higher than a criterional value and a torque component of said current is negative.

5. The variable speed system according to claim 2 wherein said control circuit discriminates between large and small loads on said motor using a value obtained by averaging said detected current for a certain time period based on a predetermined value during an acceleration of the motor.

6. The variable speed system according to claim 5 wherein said control circuit uses a value obtained by averaging said detected current for a period from said current detection range fz to one half thereof during an acceleration of the motor.

7. The variable speed system according to claim 5 wherein said control circuit uses a value obtained by averaging said detected current for a period from said base frequency f0 to one half thereof during an acceleration of the motor.

8. The variable speed system according to claim 5 wherein said control circuit performs averaging of said detected current by a first order lag filter based on said first order lag filter time constant T.

9. The variable speed system according to claim 8 wherein said control circuit determines an output frequency in accordance with a value obtained by averaging said detected current, based on the high speed output frequency fh, the medium speed output frequency fm, the high-speed setting upper limit current value Imax and the medium-speed setting lower limit current value Imin.

10. The variable speed system according to claim 5 wherein said control circuit performs averaging of said detected current by a first order lag filter based on a first order lag filter time constant T automatically set by said acceleration time ta and said maximum output frequency fmax.

11. The variable speed system according to claim 10 wherein said control circuit determines an output frequency in accordance with a value obtained by averaging said detected current, based on the high speed output frequency fh, the medium speed output frequency fm, the high-speed setting upper limit current value Imax and the medium-speed setting lower limit current value Imin.

* * * * *

UNITED STATES PATENT AND TRADEMARK OFFICE
CERTIFICATE OF CORRECTION

PATENT NO.   : 5,723,968
DATED        : March 3, 1998
INVENTOR(S)  : Sakurai

It is certified that error(s) appears in the above-identified patent and that said Letters Patent is hereby corrected as shown below:

On the title page, please amend the filing date to read:

--September 29, 1995--

Signed and Sealed this

Fourteenth Day of March, 2000

Attest:

Q. TODD DICKINSON

*Attesting Officer*  *Commissioner of Patents and Trademarks*